(12) United States Patent
Aust

(10) Patent No.: US 7,742,891 B2
(45) Date of Patent: Jun. 22, 2010

(54) SYSTEM FOR COMPENSATING FOR CREEP AND HYSTERESIS IN A LOAD CELL

(75) Inventor: Michael M. Aust, San Francisco, CA (US)

(73) Assignee: The AIS Group, LLC, San Francisco, CA (US)

( * ) Notice: Subject to any disclaimer, the term of this patent is extended or adjusted under 35 U.S.C. 154(b) by 98 days.

(21) Appl. No.: 11/872,089

(22) Filed: Oct. 15, 2007

(65) Prior Publication Data

US 2008/0228425 A1    Sep. 18, 2008

Related U.S. Application Data

(63) Continuation of application No. 11/179,981, filed on Jul. 11, 2005, now Pat. No. 7,292,951.

(60) Provisional application No. 60/586,667, filed on Jul. 9, 2004.

(51) Int. Cl.
*G06F 19/00* (2006.01)

(52) U.S. Cl. ........................ 702/101; 702/102; 702/173; 73/862.623; 73/1.13; 177/211; 177/229; 177/136; 177/139

(58) Field of Classification Search ................ 702/101, 702/102, 173; 73/862.623, 862.66, 781, 73/782, 1.13, 862.59; 338/3, 6; 177/DIG. 9, 177/50, 136–139, 141, 211, 229
See application file for complete search history.

(56) References Cited

U.S. PATENT DOCUMENTS

| 3,709,310 | A | * | 1/1973 | Cooke et al. | 177/168 |
|---|---|---|---|---|---|
| 5,031,463 | A | * | 7/1991 | Hess | 73/766 |
| 5,308,931 | A | * | 5/1994 | Griffen | 177/25.14 |
| 5,780,777 | A | * | 7/1998 | Selig | 177/25.11 |
| 5,837,946 | A | * | 11/1998 | Johnson et al. | 177/136 |
| 6,792,371 | B1 | * | 9/2004 | Turner | 702/101 |
| 7,009,118 | B2 | * | 3/2006 | Pottebaum et al. | 177/136 |
| 2006/0064264 | A1 | * | 3/2006 | Pottebaum et al. | 702/101 |

* cited by examiner

*Primary Examiner*—Carol S Tsai

(57) ABSTRACT

A method of compensating for hysteresis in a load cell, by: (a) pre-calibrating a load cell by: measuring load cell deflection under progressively increasing loads; determining a first set of coefficients correlating the deflection of the load cell to the measured load under the progressively increasing loads; measuring load cell deflection under progressively decreasing loads; determining a second set of coefficients correlating the deflection of the load cell to the measured load under the progressively decreasing loads; and then (b) compensating for hysteresis in the load cell, by: selecting the first set of coefficients if the load on the load cell has been progressively increasing, or selecting the second set of coefficients if the load on the load cell has been progressively decreasing; and applying a formula using the selected first or second set of coefficients to the measured load cell deflection at the particular load, thereby determining an accurate load cell deflection, and thus compensating for hysteresis in the load cell.

14 Claims, 3 Drawing Sheets

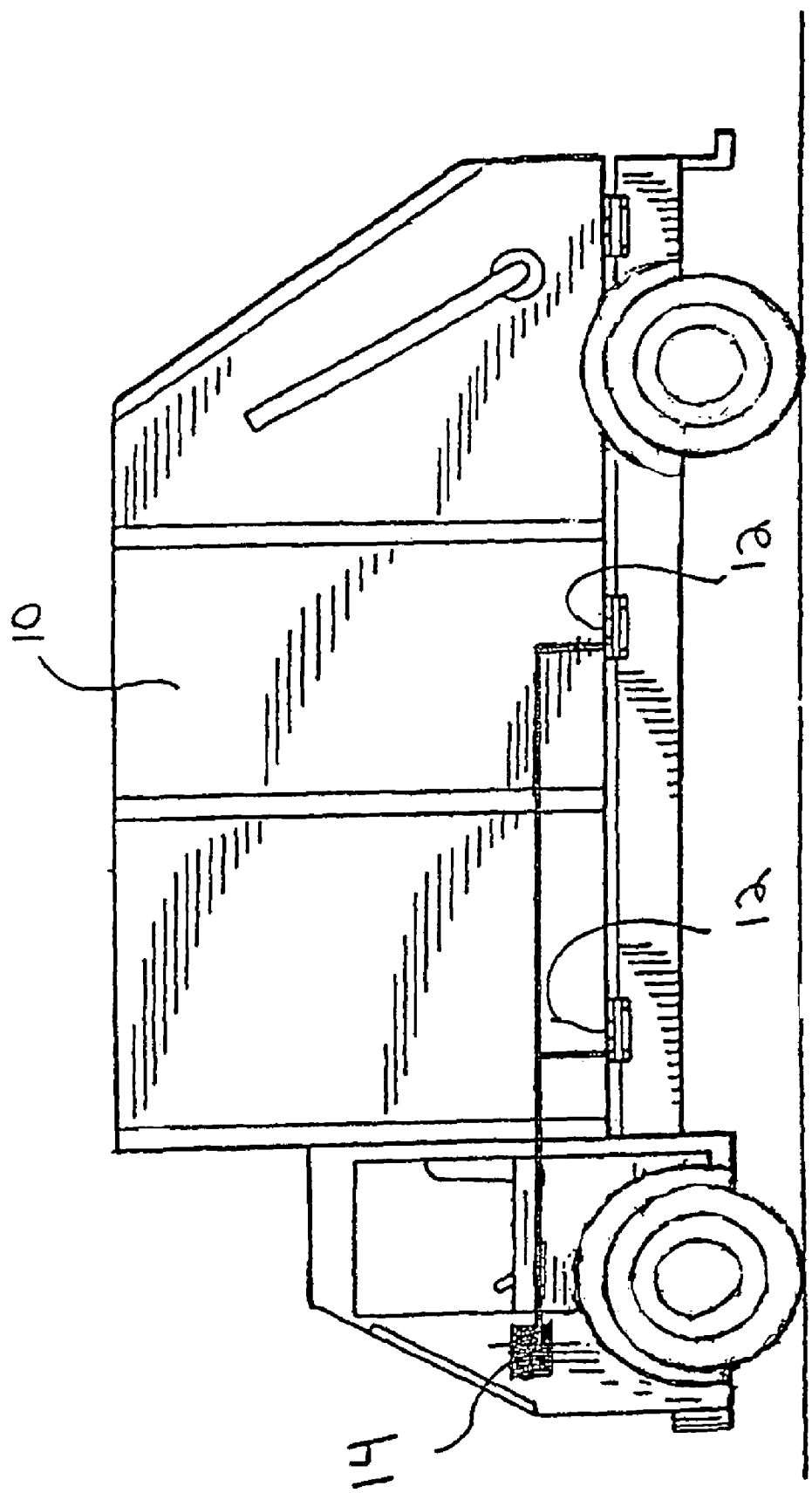

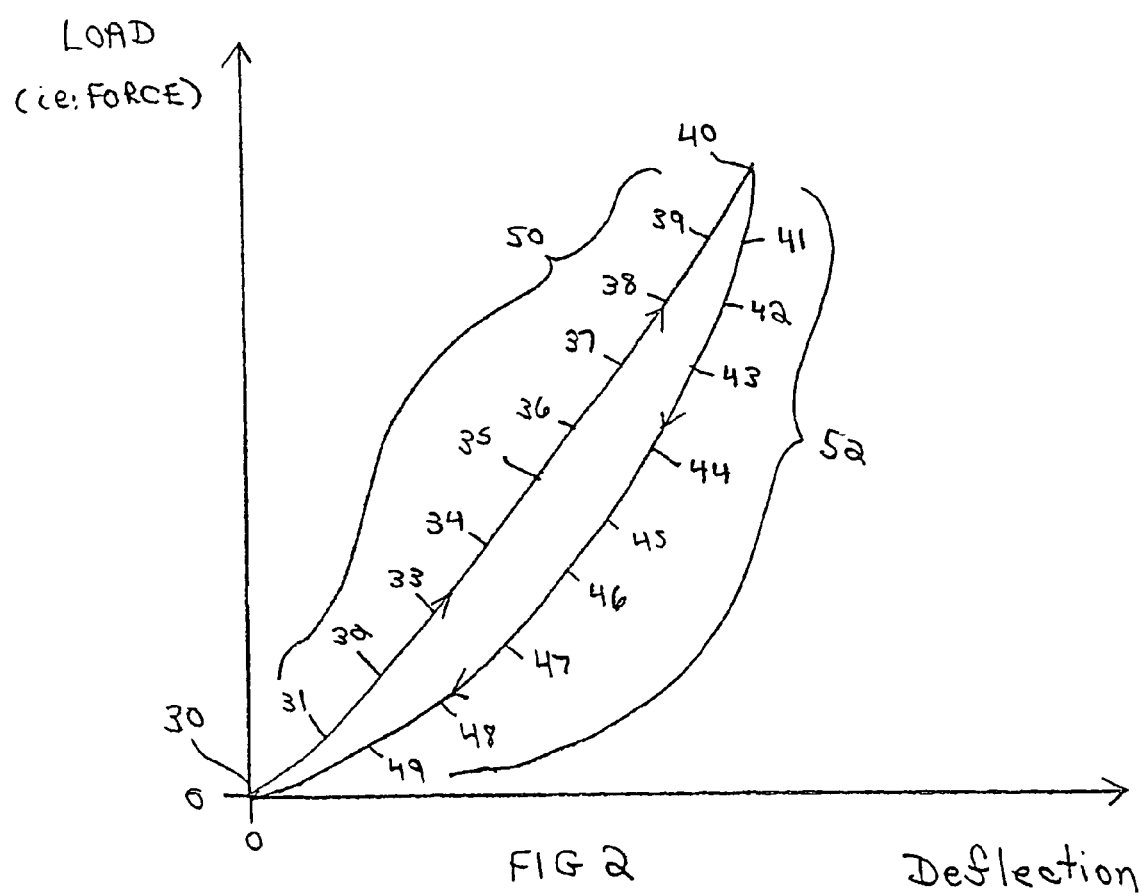

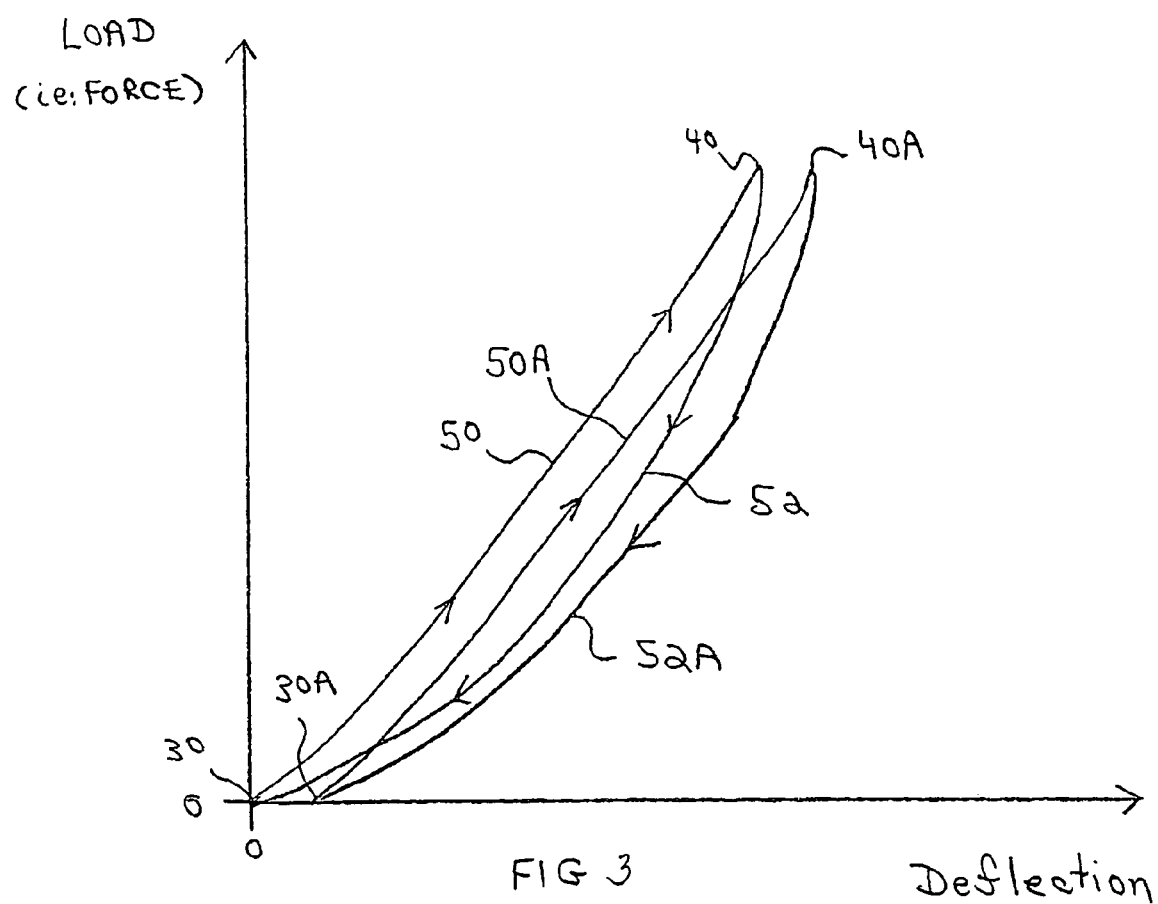

SYSTEM FOR COMPENSATING FOR CREEP AND HYSTERESIS IN A LOAD CELL

PRIORITY CLAIM

This application is a Continuation of application Ser. No. 11/179,981, filed Jul. 5, 2005, the content of which is incorporated herein by reference in its entirety, which claims priority to U.S. Provisional Patent Application No. 60/586,667, filed Jul. 9, 2004, entitled Systems for Compensating for Creep and Hysteresis in a Load Cell.

TECHNICAL FIELD

The present invention relates to load cells in general and in particular to load cells used for weighing loads in trucks, such as transport truck and garbage trucks. However, it is to be understood that the present invention is not limited to load cells used in vehicle weighing systems.

BACKGROUND OF THE INVENTION

Trucks (including transport and garbage trucks) often contain load cells which are used for weighing the loads within the truck. It is important to weigh loads in trucks in general both to ensure regulatory compliance, and also to ensure that the loads are balanced within the trucks. It is also important to weigh loads in garbage trucks in particular since garbage truck operators often bill in terms of the weight they haul.

Over time, the weight readings given by these load cells will tend to become inaccurate due to "creep" within the metal of the load cell block. IE: after prolonged loading of a load cell, the loads will tend to produce a slightly greater distortion in the load cell over time (due to metal fatigue). Moreover, the amount of such "creep" distortions may be different at different loads.

A further problem with load cells is that the measured "force vs. deflection" relationship of the load cell is different when: (a) the loads are being progressively added to the load cell, and when (b) the loads are being progressively removed from the load cell. As a result, the same force applied to a load cell with result in a first deflection if weight had been previously added to the load cell; and a second deflection if weight had been previously removed from to the load cell.

A problem with existing truck load cells is that they are typically calibrated with only a single "force vs. deflection" relationship. Most typically, this "force vs. deflection" relationship is calibrated under conditions of increasing load. Thus, as weight is progressively added to the truck, the load cells will accurately indicate the addition of this load. However, as weight is removed from the load cell, the load cell will tend to show somewhat inaccurate results. This has proved to be particularly problematic for truck operators. Specifically, the portions of the total loads they are hauling are frequently added and/or removed during normal operations, resulting in somewhat inaccurate load cell readings.

Lastly, temperature variations of the load cells will tend to skew their weight readings.

What is instead desired is a load cell weighing system that provides accurate readings both as weight is added or removed from the load cell, thereby compensating for hysteresis in the load cell. Ideally, as well, such a system would also compensate for metal fatigue or "creep" as well. Lastly, as well, such a system would also compensate for temperature changes in the load cell.

SUMMARY OF THE INVENTION

The present invention provides a load cell weighing system that can (in preferred embodiments) be incorporated into a vehicle such as a transport truck or garbage truck. The present load cell advantageously compensates for hysteresis, creep and temperature changes such that an accurate weight reading can be given by the load cell, regardless of whether weight is being added or removed from the load cell, and regardless of how many times the load cell has been used.

BRIEF DESCRIPTION OF THE DRAWINGS

FIG. 1 is a schematic illustration of a vehicle load weighing system incorporating the present invention.

FIG. 2 is a Load vs. Deflection relationship for a typical load cell.

FIG. 3 is an illustration similar to FIG. 3, showing "creep" (i.e.: movement of the Load vs. Deflection relationship for the load cell over time).

DETAILED DESCRIPTION OF THE DRAWINGS

As shown in FIG. 1, a truck 10 having a plurality of load cells 12 is provided. Loads cells are preferably in communication with an on-board processor 14. In preferred embodiments, processor 14 communicates with load cells 12 via message packets transmitted via a controller area network interface (CAN). An advantage of such a system is that firmware upgrades (including new features or bug corrections) can be transmitted to the individual load cells 12. However, the present invention is not limited to systems in which message packets are transmitted via CAN to the individual load cells.

In various embodiments of the invention, individual load cells 12 have logic circuits therein; but the present invention is not so limited.

FIG. 2 is an illustration of a typical Load vs. Deflection relationship for a load cell 12 showing the effect of hysteresis, as follows.

When no load (i.e. force) is applied to the load cell, there is no deflection (point 30).

When progressively increasing loads are applied to load cell 12, it will progressively deflect to positions represented by points 31, 32, 33, 34, 35, 36, 37, 38, 39, to 40. The curve moving upwardly through data points 30 to 40 is represented as curve 50. (Such progressively increasing loads occur when the truck is being loaded).

When progressively decreasing loads are then applied to load cell 12, it will progressively deflect to positions represented by points 41, 42, 43, 44, 45, 46, 47, 48, 49, to 30. The curve moving downwardly through data points 40 to 30 is represented as curve 52. (Such progressively increasing loads occur when the truck is being unloaded).

As can be seen, a different "load vs. displacement" relationship is seen when weight is added to load cell 12 (i.e.: curve 50) than when weight is removed from load cell 12 (i.e.: curve 52).

In accordance with the present invention, load cell 12 is pre-calibrated such that both curves 50 and 52 are programmed therein.

In accordance with the present invention, load cell 12, (and/or logical circuitry connected thereto), is configured to detect whether the loads on the load cell have been increasing or decreasing. This can be accomplished simply by recording successive loads on the load cell and then determining whether the previous load (or loads) is more or less than the currently measured load. For example, the present system may simply determine whether the load immediately prior to the measured load was higher or lower. Alternately, the present system may examine a series of loads taken prior to the currently measured load. The present system may also determine a running average of prior loads, etc.

The advantage of having both curves 50 and 52 programmed into the present system is that the appropriate curve is selected depending upon whether the loads are increasing or decreasing on the load cell. Thus, appropriate correction can be made to the measured deflection of the load cell, thereby accurately determining the load on the load cell (regardless of whether the truck is being loaded or unloaded).

FIG. 3 shows metal fatigue or "creep" in the load cell block. Specifically, over time, curve 50 and 52 will move to positions 50A and 50B, respectively. As can be seen, over time, points 30 and 40 move to points 30A and 40, respectively.

In accordance with the present invention, load cell 12, (and/or logical circuitry connected thereto), is optionally configured to remember or determine the number of times load cell has been used. In accordance with the present invention, the relationship defining the movement of curves 50 and 52 to 50A and 52A over time is stored within load cell 12, (and/or logical circuitry connected thereto). Thus, appropriate correction can be made to the measured deflection of the load cell, thereby accurately determining the load on the load cell (taking into account "creep" in the load cell).

Also, in accordance with the present invention, load cell 12, (and/or logical circuitry connected thereto), is optionally configured with a "temperature v. deflection" relationship stored therein. Thus, appropriate correction can be made to the measured deflection of the load cell, thereby accurately determining the load on the load cell (taking into account the temperature of the load cell).

In preferred aspects, the present invention provides compensation for hysteresis in a load cell by: (a) pre-calibrating a load cell for hysteresis by: (i) measuring load cell deflection under progressively increasing loads; (ii) determining a first set of coefficients correlating the deflection of the load cell to the measured load under the progressively increasing loads; (iii) measuring load cell deflection under progressively decreasing loads; (iv) determining a second set of coefficients correlating the deflection of the load cell to the measured load under the progressively decreasing loads; and then (b) compensating for hysteresis in the load cell, by: (i) measuring load cell deflection at a particular load; (ii) selecting the first set of coefficients if the load on the load cell has been progressively increasing prior to the particular load being applied, or selecting the second set of coefficients if the load on the load cell has been progressively decreasing prior to the particular load being applied; and (iii) applying a formula using the selected first or second set of coefficients to the measured load cell deflection at the particular load, thereby determining an accurate load cell deflection, and thus compensating for hysteresis in the load cell.

In this aspect of the invention, determining the first set of coefficients comprises determining a curve through data points 30, 31, 32, 33, 34, 35, 36, 37, 38, 39, to 40. The first set of coefficients may be quadratic or cubic equations. The first set of coefficients may be stored in, and retrieved from, memory in the load cell itself, or memory in a computer or processor in communication with the load cell (e.g.: though a CAN). The first set of coefficients may optionally be determined by least squares regression. The first set of coefficients may be determined experimentally, or by computer modeling.

In this aspect of the invention, determining the second set of coefficients comprises determining a curve through data points 40, 41, 42, 43, 44, 45, 46, 47, 48, 49, to 30. The second set of coefficients may be quadratic or cubic equations. The second set of coefficients may be stored in, and retrieved from, memory in the load cell itself, or memory in a computer or processor in communication with the load cell (e.g.: though a CAN). The second set of coefficients may optionally be determined by least squares regression. The second set of coefficients may be determined experimentally, or by computer modeling.

In further optional aspects, the present invention provides compensation for creep in the load cell, by: (a) pre-calibrating the load cell for creep by: (i) measuring load cell deflection under a prolonged load; (ii) determining a third set of coefficients correlating changes in deflection of the load cell to the measured load under the prolonged load; and (b) compensating for creep in the load cell, by: (i) measuring load cell deflection after the load cell has been subjected to a prolonged load for a particular amount of time; and then (ii) applying a formula using the third set of coefficients to the measured load cell deflection after the particular amount of time, thereby determining an accurate load cell deflection, and thus compensating for creep in the load cell.

The third set of coefficients may be quadratic or cubic equations. The third set of coefficients may be stored in, and retrieved from, memory in the load cell itself, or memory in a computer or processor in communication with the load cell (e.g.: though a CAN). The third set of coefficients may optionally be determined by least squares regression. The third set of coefficients may be determined experimentally, or by computer modeling.

In further optional aspects, the present invention provides compensation for temperature changes in the load cell, by: applying a temperature formula to the measured load cell deflection, the temperature formula correlating the temperature of the load cell with the measured deflection of the load cell under various loading conditions.

The temperature formula may be stored in, and retrieved from, memory in the load cell itself, or memory in a computer or processor in communication with the load cell (e.g.: though a CAN). The temperature formula may optionally be determined by least squares regression. The third set of coefficients may be determined experimentally, or by computer modeling.

What is claimed is:

1. A method of correcting for errors in a load cell, comprising the steps of:
   a. measuring load cell deflection under increasing loads;
      i. determining an increasing load curve;
   b. measuring load cell deflection under decreasing loads;
      i. determining a decreasing load curve;
   c. determining a measured load cell deflection after one of, either;
      i. increasing the load on the load cell; or
      ii. decreasing the load on the load cell;
   d. correcting the measured load cell deflection by applying the measured load cell deflection to, either;
      i. the increasing load curve in the event that the determining step occurred after increasing the load on the cell; or
      ii. the decreasing load curve in the event that the determining step occurred after decreasing the load on the cell;

e. determining a corrected load and thus compensating for error in the load cell related to increasing or decreasing loads; and
f. compensating for temperature changes in the load cell by applying a temperature formula to the measured load cell deflection, the temperature formula correlating the temperature of the load cell with the measured deflection of the load cell under various loading conditions.

2. The method of claim 1, wherein, the increasing load curve is determined by:
   a. collecting a plurality of data points by subjecting the load cell to progressively increasing loads and measuring the load cell deflection for each load.

3. The method of claim 1, wherein, the decreasing load curve is determined by:
   a. collecting a plurality of data points by subjecting the load cell to progressively decreasing loads and measuring the load cell deflection for each load.

4. The method of claim 1, wherein the step of applying the increasing load curve or the decreasing load curve to the measured load cell deflection further comprising the step of:
   a. retrieving the increasing load curve or the decreasing load curve from a memory.

5. The method of claim 1, wherein the load cell is disposed in a vehicle, and wherein the step of applying the selected increasing load curve or the decreasing load curve to the measured load cell deflection further comprising the step of:
   a. retrieving the increasing load curve or the decreasing load curve from memory stored in a processor in the vehicle.

6. The method of claim 5, wherein the vehicle is a truck.

7. A method of correcting for errors in a load cell, comprising the steps of:
   a. calibrating the load cell by:
      i. measuring load cell deflection under a prolonged load and using this measurement to determine;
         1. a prolonged increasing load curve;
         2. a prolonged decreasing load curve; and
   b. determining a measured load cell deflection after one of, either;
      i. increasing the load on the load cell; or
      ii. decreasing the load on the load cell;
   c. correcting for errors in the load cell by applying the measured load cell deflection to, either;
      i. the prolonged increasing load curve in the event that the determining step occurred after increasing the load on the cell; or
      ii. the prolonged decreasing load curve in the event that the determining step occurred after decreasing the load on the cell; and
   d. determining a corrected load and thus compensating for error in the load cell due to prolonged load.

8. The method of claim 7, wherein, the prolonged increasing load curve is determined by:
   a. collecting a plurality of data points by subjecting the load cell to prolonged progressively increasing loads and measuring the load cell deflection for each prolonged load.

9. The method of claim 7, wherein, the prolonged decreasing load curve is determined by:
   a. collecting a plurality of data points by subjecting the load cell to prolonged progressively decreasing loads and measuring the load cell deflection for each prolonged load.

10. The method of claim 7 wherein the step of applying the prolonged decreasing load curve or the prolonged increasing load curve to the measured load cell deflection further comprising the step of:
    a. retrieving the prolonged decreasing load curve or the prolonged increasing load curve from a memory.

11. The method of claim 7, wherein the load cell is disposed in a vehicle, and wherein the step of applying the selected prolonged increasing load curve or the prolonged decreasing load curve to the measured load cell deflection further comprising the step of:
    a. retrieving the prolonged increasing load curve or the prolonged decreasing load curve from memory stored in a processor in the vehicle.

12. The method of claim 7, wherein the step of applying the prolonged increasing load curve or the prolonged decreasing load curves further comprising the step of:
    a. retrieving the prolonged increasing load curve or the prolonged decreasing load curve from a memory stored in the load cell itself.

13. The method of claim 7, further comprising:
    a. compensating for temperature changes in the load cell by applying a temperature formula to the measured load cell deflection, the temperature formula correlating the temperature of the load cell with the measured deflection of the load cell under various loading conditions.

14. A method of correcting for errors in a load cell, comprising the steps of:
    a. measuring load cell deflection under increasing loads;
       i. determining an increasing load curve;
    b. measuring load cell deflection under decreasing loads;
       i. determining a decreasing load curve;
    c. calibrating the load cell by:
       i. measuring load cell deflection under a prolonged load and using this measurement to determine;
          1. a prolonged increasing load curve;
          2. a prolonged decreasing load curve; and
    d. determining a measured load cell deflection after one of, either;
       i. increasing the load on the load cell; or
       ii. decreasing the load on the load cell;
    e. calculating a corrected load cell deflection by applying the measured load cell deflection to, either;
       i. the increasing load curve in the event that the determining step occurred after increasing the load on the cell; or
       ii. the decreasing load curve in the event that the determining step occurred after decreasing the load on the cell;
    f. correcting for errors in the load cell by applying the corrected load cell deflection to;
       i. either the prolonged increasing load curve in the event that the determining step occurred after increasing the load on the cell; or
       ii. the prolonged decreasing load curve in the event that the determining step occurred after decreasing the load on the cell;
    g. thereby determining a corrected load and thus compensating for error in the load cell related to increasing or decreasing loads and prolonged load.

* * * * *